(12) United States Patent
Lippincott

(10) Patent No.: US 7,020,891 B1
(45) Date of Patent: Mar. 28, 2006

(54) INTERNET DOMAIN AND TIME INDEX BASED VIDEO EMAIL SYSTEM

(75) Inventor: Louis A. Lippincott, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 1069 days.

(21) Appl. No.: 09/672,372

(22) Filed: Sep. 28, 2000

(51) Int. Cl.
*H04N 7/173* (2006.01)

(52) U.S. Cl. .............................. 725/87; 725/92; 725/93; 725/100; 725/110; 725/131

(58) Field of Classification Search ................. 725/87, 725/92, 93, 100, 110, 131, 38, 39, 58, 89, 725/101, 142; 709/219
See application file for complete search history.

(56) References Cited

U.S. PATENT DOCUMENTS

| | | | | |
|---|---|---|---|---|
| 5,721,829 | A * | 2/1998 | Dunn et al. ................... | 725/87 |
| 5,872,588 | A * | 2/1999 | Aras et al. ..................... | 725/14 |
| 6,438,140 | B1 * | 8/2002 | Jungers et al. ............... | 370/471 |
| 6,771,703 | B1 * | 8/2004 | Oguz et al. ............ | 375/240.03 |
| 2002/0059610 | A1 * | 5/2002 | Ellis ............................ | 725/58 |
| 2003/0074660 | A1 * | 4/2003 | McCormack et al. .......... | 725/2 |

\* cited by examiner

Primary Examiner—Kieu-Oanh Bui
(74) Attorney, Agent, or Firm—Blakely, Sokoloff, Taylor & Zafman LLP

(57) ABSTRACT

A device is provided that includes a first processor connected to a communications channel device. The communications device is capable of receiving and transmitting information to a video-on-demand (VOD) service provider. A VOD content decoder is provided that is conencted to the first processor. A video and audio formatting processor is provided that is connected to the first processor and the content decoder. An index memory is provided that is connected to the first processor. The index memory stores a plurality of VOD program segment representations of either whole VOD program content or partial VOD program content. Also provided is a method that includes selecting a start and stop time for recording a representation of a segment of at least one VOD program. The method also includes converting a VOD program identifier of at least one VOD program to a text representation. Also, either converting the text representation of the VOD program identifier of at least one VOD program into a unique encoded digital representation or receiving a unique encoded digital representation from the VOD service provider. Converting the start and stop time for a segment of at least one VOD program to a digital representation. And storing the VOD program identifier encoded digital representation and the start and stop digital representation in an index memory.

29 Claims, 5 Drawing Sheets

|                                    | TIME                          |
| Selection   List                   | Selection   Displayed         |

Program 1
Program 2
   .
   .
   .
Program N

Pre-recorded Segment 1
Pre-recorded Segment 2 (Mary please see this CNN © piece)
   .
   .
   .
Pre-recorded Segment N

FIGURE 3.

| Selection List | TIME Selection Displayed |
|---|---|
| Program 1 | |
| Program 2 | |
| . | |
| . | |
| . | |
| Program N | |
| | |
| Pre-recorded Segment 1 | |
| Pre-recorded Segment 2 | |
| . | |
| . | |
| . | |
| Pre-recorded Segment N | |
| | EMAIL |

FIGURE 5.

| Selection List | TIME Selection Displayed |
|---|---|
| Program 1 | |
| Program 2 | |
| . | |
| . | |
| . | |
| Program N | |
| | |
| Pre-recorded Segment 1 | |
| Pre-recorded Segment 2 | |
| . | |
| . | |
| . | |
| Pre-recorded Segment N | Address Book |
| Enter email address:_____ | Subject |
| Attachments | Message |
| SEND          CANCEL | |

FIGURE 6.

INTERNET DOMAIN AND TIME INDEX BASED VIDEO EMAIL SYSTEM

BACKGROUND OF THE INVENTION

1. Field of the Invention

This invention relates to video on demand (VOD) systems, and more particularly to emailing indexes of VOD program content.

2. Background Information

With the evolution of video and other media towards video on demand (VOD), distribution of television (TV) content is changing. In one scenario, VOD systems may incorporate streaming of "library" files that contain TV programs, Karaoke files, music, etc. These files may likely be fairly large, depending on the quality of the file. A content provider will store all of the supplied content on a database. Any user wanting to view a TV broadcast needs to establish a connection between their viewing device and the provider's server. The video server sends the content, in a compressed form, to a viewing device, such as a set-top box (STB) connected to a video display device, such as a monitor or television. The STB would then decode the content and transmit the decoded content to the video display device.

The user's STB would be capable of storing part or all of a TV program in a memory. The user can select any movie or program from a selection menu, and retain complete video stream control. Making use of non-linear digital editing, or non-sequential access, the user will then be able to "slow rewind," "fast rewind," "slow forward," "fast forward," or "pause" the viewing of the program. Because of the size of the viewing program, and due to intellectual property rights of the owners of the content, saving or copying a content for later viewing by others may not be practical, and may result in violation of intellectual property laws.

BRIEF DESCRIPTION OF THE DRAWINGS

FIG. 3 illustrates a graphics overlay screen for an embodiment of the invention.

FIG. 5 illustrates a graphics overlay screen of an embodiment of the invention having email capability for attaching encoded VOD segment representations.

FIG. 6 illustrates a graphics overlay screen of an embodiment of the invention having basic email functionality.

DETAILED DESCRIPTION

The invention generally relates to a method and apparatus for creating audio/video command strings to eliminate the copying and transmission of large audio/video data streams. Referring to the figures, exemplary embodiments of the invention will now be described. The exemplary embodiments are provided to illustrate the invention and should not be construed as limiting the scope of the invention.

Figure 1:
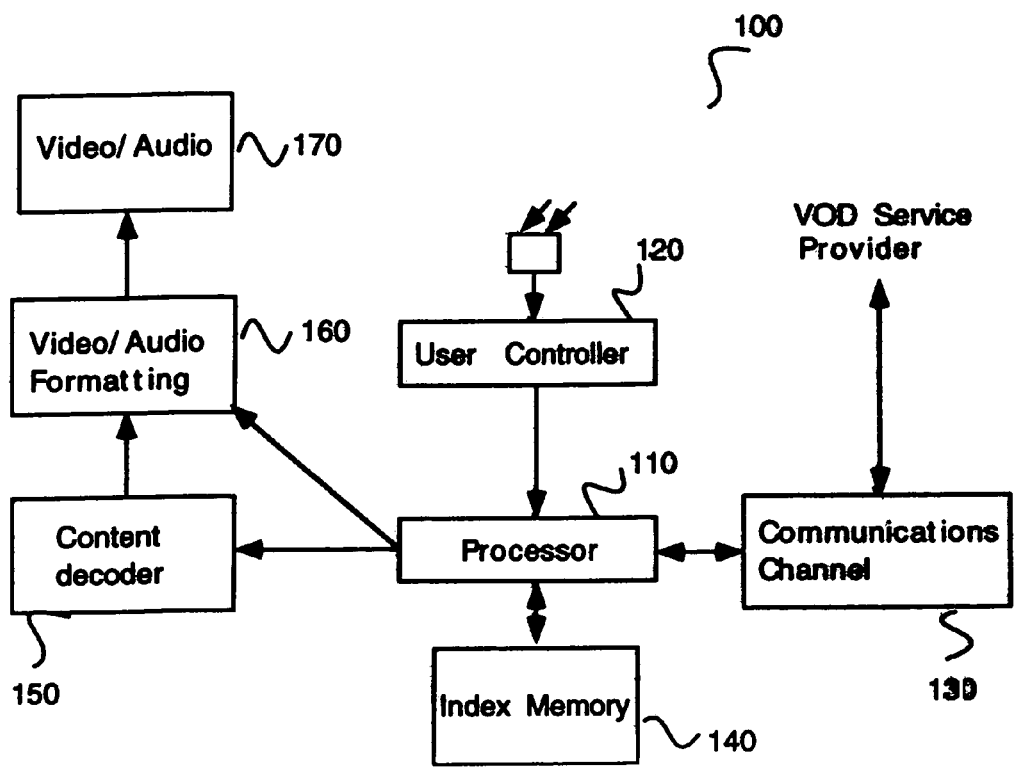
FIG. 1 illustrates an embodiment of the invention including an index memory coupled to a set-top-box (STB) processor.

FIG. 1 illustrates a system for receiving, viewing, recording, saving, sending information relating to video on demand (VOD) formatted streams. System 100 in FIG. 1 includes a set-top box (STB) processor 110, a user controller 120, communications channel 130, content index memory 140, content decoder 150, video/audio formatting module 160, and video/audio device 170. STB processor 110, may include, but is not limited to, a central processing unit (CPU), read and write memory (RAM), and read only memory (ROM) components. User controller 120 can be a infrared remote control, keyboard or computer mouse. One skilled in the art will recognize that user controller 120 may be any type of controller capable of receiving user commands, such as a voice activated controller. Communications channel 130 is the connection to a VOD service provider. Communications channel 130 could be a satellite connection, cable connection, or any other state of the art connection. Index memory 140 stores VOD content indexes, such as content ID, start time of a user selected segment of a VOD decoded stream, and stop time of a user selected segment of a VOD stream. Index memory 140 can be a non volatile read and write memory (NVRAM) or any other similar state of the art memory device available. Content decoder 150 decodes the VOD stream received from a provider in a compressed format. Video/audio formatting 160 arranges the VOD decoded stream into a stream that can be viewed and heard on video/audio device 170. Video/audio device 170 can be any device capable of being viewed and heard by a user, such as a television, stereo, or computer system.

In one embodiment, a user can select a segment of a VOD stream to record and save an encoded segment identifying indexes, such as beginning and ending of a stream that is currently or has been viewed by the user. By recording and saving only encoded indexes, very little storage space is used, and the VOD stream is not duplicated which, prevents infringing intellectual property laws. A scenario will be presented to illustrate the use of this embodiment.

Assume a first user has selected to view a VOD program. After the user selected the desired program, the stream is sent from the provider to the users STB system. The user can then view the decoded VOD program whenever she chooses. With use of non-sequential editing features, the user can pause, rewind, fast forward, or play the VOD program as desired. In this scenario, after the first user views the VOD program, the user believes that a segment of the content would be of interest to a second user. Therefore, the first user accesses the VOD program, rewinds to the desired segment, and records the segment that she believes would be of interest to the second user. Assuming there are multiple segments of the VOD program that would be of interest to the second user, the first user repeats the recording for a muliplicity of segments. When the second user is available to view the recorded segments, the second user can choose any one of the recorded segments to begin viewing the content of the VOD program. Thus, in one embodiment, because of the large amount of memory that would be required to store a complete recording of a plurality of segments, the recording of the segment only includes indexing of the segment(s).

Figure 2:
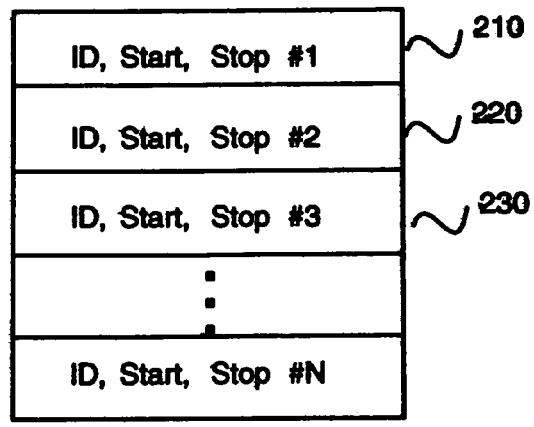
FIG. 2 illustrates an index memory device of an embodiment of the invention.

Indexing of a segment of a VOD program is represented in a unique sequence of bytes. For example, assuming a user is viewing a Cable News Network (CNN ©) VOD program on Feb. 15, 2000. The user selects to record a segment of the VOD program at 5:10 PM, and the user selects to stop recording a segment of a VOD program at 5:12PM. STB processor 110 converts the VOD program identifier (ID) for the program selection into a string of text characters, e.g., "CNN Feb. 15, 2000." The string of text characters is then converted by STB processor 110 into a unique 32-bit identifier. In another embodiment, the unique identifier is retrieved from the service provider by STB processor 110. The unique identifier along with the start and stop indexes are then stored into index memory 140. In one embodiment, the start and stop indexes are stored in ¼ second intervals. One skilled in the art will note that other timing intervals can be used, such as ⅛ second intervals. For the above example, a 10 byte sequence of 4838A5B7 03C5A0 03C780 is stored representing a first recorded segment which, is illustrated in FIG. 2 as segment 210. The 4838A5B7 bytes represent a unique ID for CNN © Feb. 15, 2000. The 03C5A0 bytes represents the recording start-time, 17 hours and 10 minutes (5:10 PM), and the 03C780 represents the recording stop-time, 17 hours and two minutes (5:12PM), in ¼ second intervals.

Assume the user selects a second content segment of the VOD program to record. In this instance, the user selects to begin recording the same VOD program at 5:15 PM, and stops recording at 5:22PM. The same sequence takes place, and the second recorded segment indexes are stored in index memory 140 as segment 220. In this instance, a 10 byte sequence, 4838A5B7 03CA50 03D0E0 is the representation for the second recorded segment. As before, the 4838A5B7 bytes represent a unique ID for CNN © Feb. 15, 2000. The 03CA50 bytes represents the recording start-time, 17 hours and 15 minutes (5:15 PM), and the 03CD0E0 represents the recording stop-time, 17 hours and twenty-two minutes (5:22PM), in ¼ second intervals. Of course, the user can continue to record segments, before, after, or during the above recorded segments by rewinding, fast-rewinding, forwarding, or fast-forwarding the VOD program to a specified segment for the recordation of segment indexes. The user can optionally enter a customized identifier to be associated with the recorded segment. The customized identifier is entered by user controller 120. For example, a customized identifier can be entered as "Mary please see this CNN © piece." This identifier is displayed as illustrated in FIG. 3.

The recorded segment representations can than be accessed by the user or an additional user(s) as long as the recorded segment representations are available in index memory 140, i.e. not deleted or erased. Assuming now that an additional user wishes to view a pre-recorded segment that is stored in index memory 140. This user selects a program to view, in this example CNN © Feb. 15, 2000. STB 100 converts the selection to a string of text, e.g. "CNN Feb. 15, 2000." Next, STB 100 converts the string of text into a unique 32-bit identifier, or receives an identifier from the VOD service provider. STB 100 searches index memory 140 for a match to the unique identifier. In this example, the search will result in two matches, segments 210 and 220. The STB includes the two segments 210 and 220 in a user selection option list that is displayed on the users video device 170. An example option list is illustrated in FIG. 3. The user option list can be any appropriate graphics overlay representation of user options.

Assuming the user selects segment 220 as their program choice by using user controller 120, STB 100 then retrieves the information contained in segment 220 from index memory 140. STB 100 converts the segment 220 to an order and sends a request to the service provider. In one embodiment, the order is represented as "CNN Feb. 15, 2000 03CA50 F0." This VOD program order represents 60 seconds (F0 in ¼ second interval) of the segment content starting at 17 hours and 15 minutes (5:15 PM). Assuming the VOD program is still available at the service provider, the VOD service provider delivers the requested order to STB 100, where it is decoded by content decoder 150, formatted by video/audio formatting 160, and then displayed on video/audio device 170. After part of the selected segment has been viewed by the user, such as the first 30 seconds, STB 100 places an order with the service provider for the next 60 seconds of the selected segment 220. In this embodiment, the order is represented as "CNN Feb. 15, 2000 03CB40 F0." The service provider then delivers the next 60 seconds of the selected segment 220. This repeats until all of the full seven minutes of segment 220 is displayed for the viewer.

Therefore, in as little as 10 bytes of memory storage for each recorded segment representation, the emulation of millions of bytes worth of VOD programming content is realized. For example, with only 12 K bytes of memory used in index memory 140, over a thousand pre-recorded segments can be represented, without having to make complete copies of program content.

Figure 4:
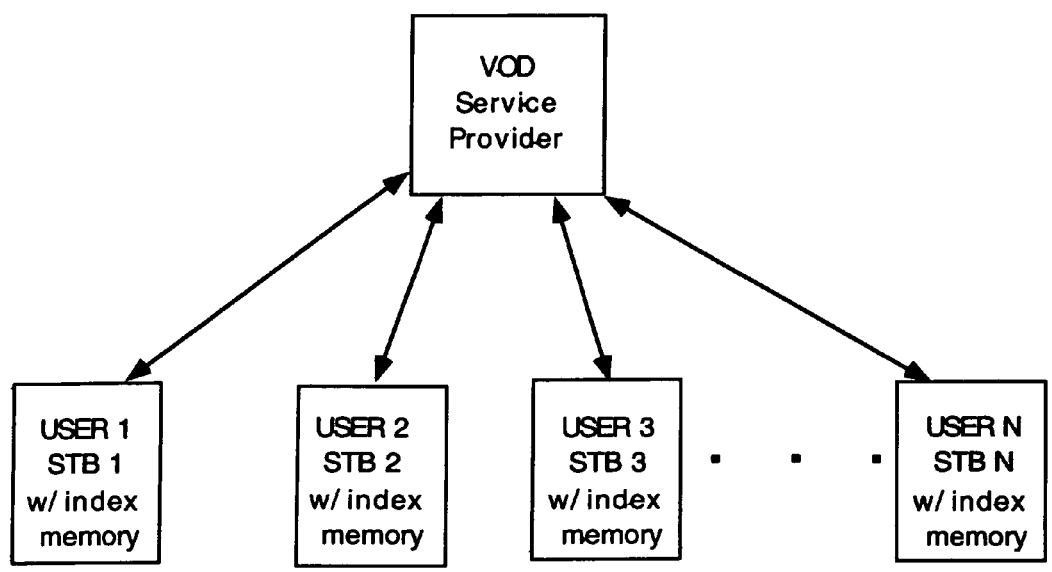
FIG. 4 illustrates a system of a plurality of embodiments of the invention having an index memory coupled to a STB at different venues coupled to a video-on-demand (VOD) service provider.

In another embodiment, STB 100 can forward the represented segments by electronic mail (email) to another user. FIG. 4 illustrates a typical network of users having STB's and a VOD service provider. The user selects the program or prerecorded segment, as described above, and selects email, as illustrated in FIG. 5. STB 100 then prompts the user to enter the email address to forward the program or segment, as illustrated in FIG. 6. The user can then access a typical email program having subject, recipients, and message entries. STB 100 then converts the program or segment into an order, as described above, and attaches the order to the email. Assuming the recipient has a similar STB and provider service, the recipient opens the received email, and the STB processes the attachment, and stores the represented segment or program in index memory 140. Assuming the represented segment or program is available at the service provider, the recipient can select the pre-recorded segment or program, as described above, and view the content.

Therefore, the sender has not copied the VOD content when attaching to an email. This embodiment can be useful for educational purposes as well. Teachers, professors, employers, friends and family members can send and receive VOD represented segments and programs that are of interest. And, the recipient and sender do not have to copy an entire segment or program. Thus, avoiding intellectual property infringements and reducing the memory size necessary for storage of segments and programs.

The above embodiments can also be stored on a device or medium and read by a machine to perform instructions. The device or medium may include a solid state memory device and/or a rotating magnetic or optical disk. The device or medium may be distributed when partitions of instructions have been separated into different machines, such as across an interconnection of computers.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. An apparatus comprising:
a first processor coupled to a communications channel device, the communications device capable of receiving and transmitting information to a video-on-demand (VOD) service provider;
a VOD content decoder coupled to the first processor;

a video and audio formatting processor coupled to the first processor and the content decoder; and an index memory coupled to the first processor, wherein the index memory stores a plurality of VOD program segment representations of at least one partial VOD program content based on at least one user selectable recording of the at least one partial VOD program content where the at least one partial VOD program content has already been viewed, and each of said plurality of VOD program segment representations is an identifier identifying a VOD program, a date the VOD program originally aired, a start time of a user selectable recording of a VOD program segment and a stop time of the user selectable recording of the VOD program segment.

2. The apparatus of claim 1, wherein the first processor receives information from a user controller.

3. The apparatus of claim 2, wherein the user controller is one of an infrared remote controller, a keyboard, a computer mouse and a voice activated controller.

4. The apparatus of claim 1, wherein the plurality of VOD program segment representations comprises an encoded identifier including a content identification, a content segment start time, and a content segment stop time.

5. The apparatus of claim 4, wherein the content identification is one of received from a VOD service provider and customized by a user.

6. The apparatus of claim 4, wherein one of the plurality of program segment representations requires 1 to 10 bytes of memory.

7. The apparatus of claim 5, wherein the content segment start time and the content segment stop time are selected by a user based on a user selected recording start time and recording stop time.

8. The apparatus of claim 1, wherein the index memory is a non-volatile read and write memory (NVRAM).

9. A system comprising:

a video-on-demand (VOD) service provider coupled to a plurality of set-top-box (STB) units, wherein each of the plurality of STB units comprises a first processor coupled to a communications channel device, the communications device capable of receiving and transmitting information to a VOD service provider;

a VOD content decoder coupled to the first processor;

a video and audio formatting processor coupled to the first processor and the content decoder; and an index memory coupled to the first processor, wherein the index memory stores a plurality of VOD program segment representations of at least one partial VOD program content based on at least one user selectable recording of the at least one partial VOD program content where the at least one partial VOD program content has already been viewed, and each of the plurality of STB units are capable of communicating with each other, and each of said plurality of VOD program segment representations is an identifier identifying a VOD program, a date the VOD program originally aired, a start time of a user selectable recording of a VOD program segment and a stop time of the user selectable recording of the VOD program segment.

10. The system of claim 9, wherein the processor receives information from a user controller, the VOD service provider, and other processors located at different venues.

11. The system of claim 10, wherein the user controller is one of an infrared remote controller, a keyboard, a computer mouse, and voice activated controller.

12. The system of claim 9, wherein the plurality of VOD program segment representations comprises a content identification, a content segment start time, and a content segment stop time.

13. The system of claim 12, wherein the content identification is one of received from a VOD service provider and selected by a user.

14. The system of claim 12, wherein one of the plurality of program segment representations requires 1 to 10 bytes of memory.

15. The system of claim 9, wherein the index memory is a non-volatile read and write memory (NVRAM).

16. The system of claim 9, wherein a user can send a VOD program segment representation as an electronic mail (email) attachment to another set-top-box unit located at a different venue.

17. A method comprising:

ordering at least one video-on-demand (VOD) program from a VOD service provider from a first set-top-box (STB) unit;

playing at least one VOD program;

selecting a start and stop time for recording a representation of a segment of the at least one VOD program, wherein the start and stop time are user selectable;

converting a VOD program identifier of the at least one VOD program to a text representation;

one of converting the text representation of the VOD program identifier of the at least one VOD program into a unique encoded digital representation and receiving a unique encoded digital representation from the VOD service provider;

converting the start and stop time for a segment of the at least one VOD program to a digital representation; and storing the VOD program identifier encoded digital representation and the start and stop digital representation as a single identifier in an index memory.

18. The method of claim 17, further comprising converting the stored VOD program identifier encoded digital representation and the start and stop digital representation of the segment of the at least one VOD program to a graphics representation, wherein a user can select the graphics representation to order the segment of the at least one VOD program.

19. The method of claim 18, further comprising attaching the stored VOD program identifier encoded digital representation and the start and stop digital representation in an electronic mail (email), and sending the email to a user located at a different venue.

20. The method of claim 19, further comprising, receiving the email, storing the attached video-on-demand (VOD) program identifier encoded digital representation and the start and stop digital representation in a second set-top-box (STB) unit, converting the VOD program identifier encoded digital representation and the start and stop digital representation to a graphics representation, selecting the graphics representation of the VOD program identifier encoded digital representation and the start and stop digital representation to order the segment of the at least one VOD program, receiving the VOD program segment on the second STB unit, decoding the VOD program segment, and formatting the VOD program segment so a user can play the VOD program segment.

21. A program storage device readable by a machine comprising instructions that cause the machine to:
   order at least one video-on-demand (VOD) program from a VOD service provider from a first set-top-box (STB) unit;
   convert a VOD program identifier of the at least one VOD program to a text representation;
   one of convert the text representation of the VOD program identifier of the at least one VOD program into a unique encoded digital representation and receive a unique encoded digital representation from the VOD service provider;
   convert a start and stop time for at least one segment of the at least one VOD program to a digital representation, where the start and stop time for the at least one segment of the at least one VOD program are user selectable and are based on a stop and a start time of a recorded representation of the at least one segment of the at least one VOD program where the at least one segment of the at least one VOD program has already been viewed; and
   store the VOD program identifier encoded digital representation and the start and stop digital representation as a single identifier in an index memory.

22. The program storage device of claim 21, wherein the instructions further cause the machine to convert the stored VOD program identifier encoded digital representation and the start and stop digital representation of the segment of the at least one VOD program to a graphics representation, wherein a user can select the graphics representation to order the segment of the at least one VOD program.

23. The program storage device of claim 21, wherein the instructions further cause the machine to
   attach the stored VOD program identifier encoded digital representation and the start and stop digital representation in an electronic mail (email), and
   send the email to a user located at a different venue.

24. The program storage device of claim 23, wherein the instructions further cause the machine to
   receive the email, store the attached VOD program identifier encoded digital representation and the start and stop digital representation in a second set-top-box (STB) unit,
   convert the VOD program identifier encoded digital representation and the start and stop digital representation to a graphics representation,
   receive the VOD program segment on the second STB unit,
   decode the VOD program segment, and
   format the VOD program segment so a user can play the VOD program segment.

25. A apparatus comprising:
   a first processor coupled to a communications channel device, the communications device capable of receiving and transmitting information to a video-on-demand (VOD) service provider;
   a VOD content decoder coupled to the first processor;
   a video and audio formatting processor coupled to the first processor and the content decoder; and
   an index memory coupled to the first processor,
   wherein the index memory stores a plurality of VOD program segment representations of at least one partial VOD program content based on at least one recording of the at least one partial VOD program content where the at least one partial VOD program content has already been viewed, and a user can send at least one VOD program segment representation of the plurality of VOD program segment representations of at least one partial VOD program as an electronic mail (email) attachment to another communications device located at a different venue, and each of said plurality of VOD program segment representations is an identifier identifying a VOD program a date the VOD program originally aired, a start time of a user selectable recording of a VOD program segment and a stop time of the user selectable recording of the VOD program segment.

26. The apparatus of claim 25, wherein the first processor receives information from a user controller.

27. The apparatus of claim 26, wherein the user controller is one of an infrared remote controller, a keyboard, a computer mouse and a voice activated controller.

28. The apparatus of claim 25, wherein the plurality of VOD program segment representations comprises a content identification, a content segment start time, and a content segment stop time.

29. The apparatus of claim 28, wherein the content identification is one of received from a VOD service provider and customized by a user.

* * * * *